United States Patent [19]

Degnan et al.

[11] 3,709,608
[45] Jan. 9, 1973

[54] ANGULAR ALIGNMENT ERROR MEASURING SYSTEM

[75] Inventors: William J. Degan, Richard W. Samsel, both of Pittsfield, Mass.

[73] Assignee: The United States of America as represented by the Secretary of the Navy

[22] Filed: March 19, 1971

[21] Appl. No.: 126,214

[52] U.S. Cl. .................356/152, 356/150, 356/172
[51] Int. Cl. ..............................................G01b 11/26
[58] Field of Search......................356/150, 152, 172

[56] References Cited

UNITED STATES PATENTS 3,242,793  3/1966  Caudill..............................356/152

Primary Examiner—Samuel Feinberg
Assistant Examiner—S. C. Buczinski
Attorney—R. S. Sciascia and Q. E. Hodges

[57] ABSTRACT

Collimated light is directed to a mirror mounted on a missile gimbal system and to a mirror mounted on a navigation optical reference. Any angular deviation from the ideal missile alignment results in light reflected from the mirrors non-parallel to the directed light. The angular variation is detected by a sensor in the collimator and the light beam is deviated by a wedge drive unit until the light is normal to the reflector. An electrical signal is generated proportional to the light beam angular compensation, to realign the missile. This invention is an improvement to the previously used angular alignment system; the improvement comprising fixed azimuth error indicator station assemblies, one station assembly mounted between each pair of missiles in a longitudinal or series array of missiles within the submarine. Each station assembly has a pair of reflectors assembled as a pentamirror, directing the collimated light to either the port or starboard missiles, or the pentamirror can be arranged to pass the light through to the next successive station, and each station assembly has a pair of wedge drive assemblies to deviate the light and measure the missile bearing misalignment angle of the port and starboard missiles.

6 Claims, 8 Drawing Figures

INVENTORS
W. J. DEGNAN
R. W. SAMSEL

INVENTORS
W. J. DEGNAN
R. W. SAMSEL

BY

ATTORNEY

INVENTORS
W. J. DEGNAN
R. W. SAMSEL
BY
*J C Hodges*
ATTORNEY

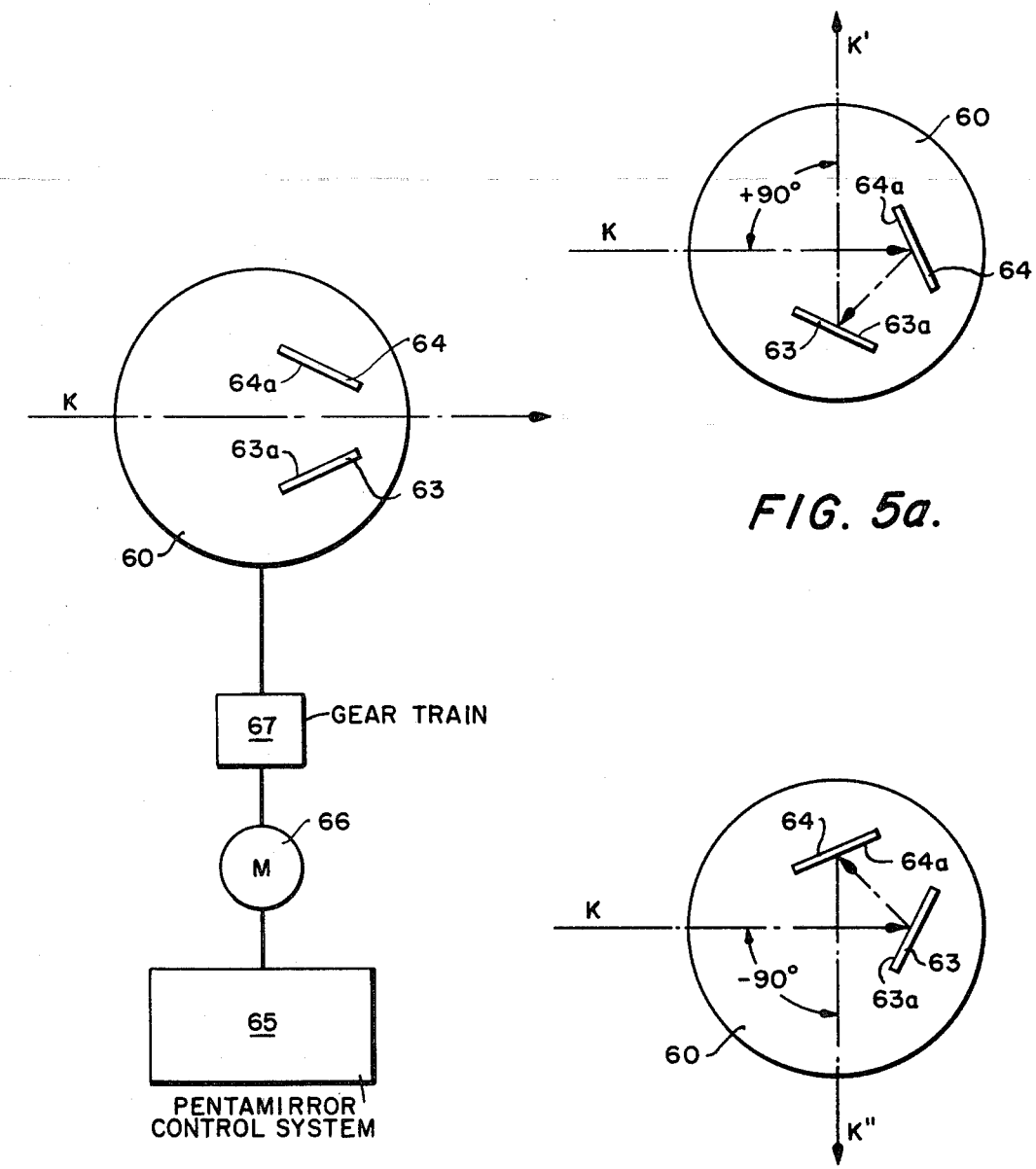

ANGULAR ALIGNMENT ERROR MEASURING SYSTEM

BACKGROUND AND SUMMARY OF THE INVENTION

The present invention relates to an improvement to an angular alignment error measuring system generally described in U.S. Pat. No. 3,326,076. The device of U.S. Pat. No. 3,326,076 comprises a source of collimated light directed through a mirror system to a prism mounted on the missile gimbal axis. Misalignment error of the missile is manifest as an angular deviation between the reflected light and the directed light. An azimuth error indicator station assembly, denoted by number 22 in the U.S. Pat. No. 3,326,076 comprises a wedge drive assembly and a system of pentamirrors for controlling the path of the light. The wedge drive assembly resolves the angular difference between the directed and reflected light and transmits an appropriate electrical error signal to the missile servo system. The directed light is aligned with the ship's inertial navigational system (denoted by number 15 in U.S. Pat. No. 3,326,076).

In this improvement the azimuth error indicator station assembly corresponding to numeral 22 in U.S. Pat. No. 3,326,076, is not mounted for movement, but one azimuth error indicator station assembly is statically mounted between each pair of missiles in a longitudinal missile series array. The improvement, comprising fixed station assemblies makes this a fixed optic system as compared to the moving trolley system of U.S. Pat. No. 3,326,076 device and is a simple, more reliable and faster performing system.

Accordingly, one object of this invention is a fixed optic angular alignment error measuring system.

A second object of this invention is a simpler, more reliable and faster performing angular alignment error measuring system.

These and other objects of the invention will be better understood when the following description of the invention is read.

BRIEF DESCRIPTION OF THE DRAWINGS

FIG. 4 shows the pentamirror and its control system with the pentamirror arranged in its see through position wherein light is passed through between the pentamirror surfaces.

FIGS. 5a and 5b shows the pentamirrors arranged to change the direction of the light path +90° and −90°, respectively.

DESCRIPTION OF THE PREFERRED EMBODIMENT

Figure 1:
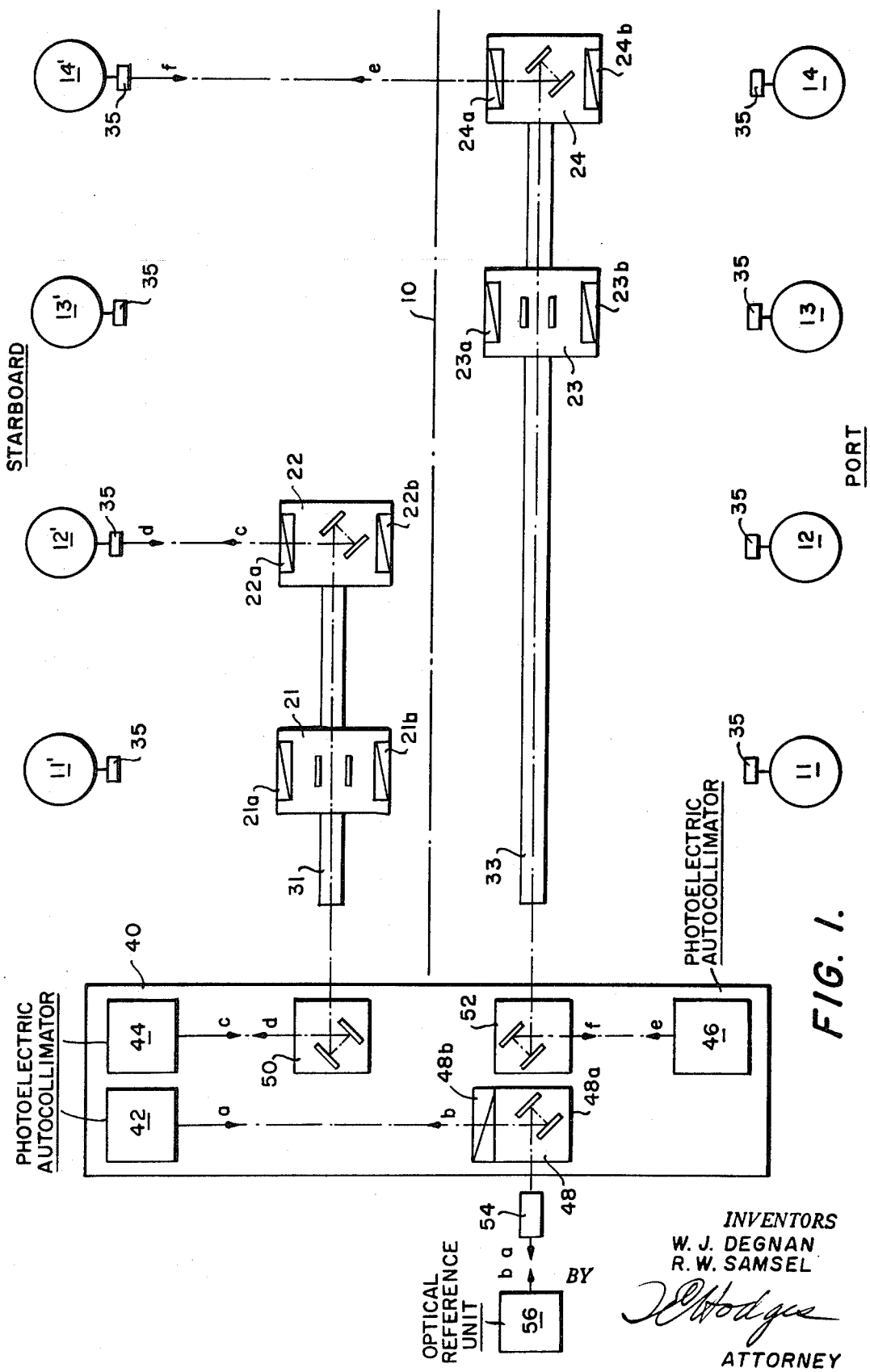
FIG. 1 shows a plan view of the angular alignment error measuring system.

Referring now to FIG. 1, a plan view of the angular alignment error measuring system used in a missile array is shown. The typical missile array shown comprises eight missiles. Missiles numbered 11, 12, 13 and 14 are arrayed on the port side of the ship with respect to the ship's centerline 10 and missiles 11', 12', 13' and 14' are arrayed on the starboard side of centerline 10. Missiles 11 and 11', 12 and 12', 13 and 13' and 14 and 14', are designated missile pairs, which are arrayed to be opposite each other in the athwartship direction and are separated by the centerline of the ship. Each of the missile pairs, 11–11', 12–12', 13–13' and 14–14', has associated with it an azimuth error indicator station assembly denoted by numerals 21, 22, 23 and 24, respectively. Station assemblies 21 and 22 are shown located on the starboard side of centerline 10 while station assemblies 23 and 24 are shown located on the port side of the centerline; station assemblies 21 and 22 are in series and in line and connected by light tube 31 and station assemblies 23 and 24 in series and in line and connected by light tube 33.

The azimuth error indicators (station assemblies) are substantially as described in U.S. Pat. No. 3,326,076, including pentamirror surfaces to control the light path through the azimuth error indicator. In addition, each station assembly wedge drive unit comprises a pair of optical wedge sets, each set being the contra-rotating optical wedges 36 and 37, shown as part of the wedge drive unit in U.S. Pat. No. 3,326,076. As shown in FIG. 1, wedge sets 21a and 21b are associated with station assembly 21, wedge sets 22a and 22b are associated with station assembly 22, and wedge sets 23a and 23b are associated with station assembly 23, and wedge sets 24a and 24b are associated with station assembly 24. Each wedge set within a station assembly faces and is used in conjunction with the porroprism 35 of its respective facing missile (i.e., 21a with missile 11' and 21b with missile 11).

Each of the missiles 11–14 and 11'–14', is represented orientationally by a porroprism. When a missile is angularly misaligned in azimuth, the missile porroprism 35 is similarly misaligned.

A photoelectric autocollimator table assembly 40 is rigidly bolted to a ship's bulkhead. Three adjustable photoelectric autocollimators 42, 44 and 46 are mounted on the photoelectric autocollimator table assembly 40 and all are aligned parallel to each other and aligned with the ship's inertial navigation system. Mounted on the photoelectric autocollimator table assembly are three servo amplifier assemblies (not shown), two table pentamirror assemblies 52 and 50 and one station assembly 48. An alignment periscope 54 is arranged opposite reference station 48 and is structured to direct the beam of light from photoelectric autocollimators 42, 44 or 46, to the optical reference unit 56 as will be hereinafter described.

OPERATION OF THE DEVICE

As shown in FIG. 1, the photoelectric autocollimator 42 directs the beam of collimated light $a$, to station assembly 48. Pentamirror 48a, within station assembly 48, changes the direction of light beam $a$ and directs it through periscope 54 to the optical reference unit 56. The optical reference unit 56 reflects a light beam $b$, through periscope 54 to pentamirror 48a, which changes its direction and directs reflected beam $b$ back towards photoelectric autocollimator 42 and through wedge drive assembly 48b.

Similarly, as shown in FIG. 1, photoelectric autocollimator 44 directs its beam of light $c$, to a pentamirror 50 which changes its direction and directs it through light tube 31 to station assembly 21. The pentamirror within station assembly 21 is arranged in the pass through position and the light beam $c$, is thereby passed through station assembly 21 to station assembly 22, in series with station assembly 21. The pentamirror within station assembly 22 is arranged to direct the beam of light to porroprism 35, associated with missile 12'. Light beam $d$, reflected from the prism 35 is directed back through station assembly 22, passing through wedge unit 22a within station assembly 22.

Similarly, as shown in FIG. 1, photoelectric autocollimator 46 directs the beam of light $e$, through pentamirror 52 which changes its direction to pass through the light tube 33 to station assembly 23. The pentamirror within station assembly 23 is arranged in the pass through position whereby light is passed through to station assembly 24. The pentamirror within station assembly 24 is arranged to deflect the light to porroprism 35 attached to missile 14'. The prism reflects beam $f$, back towards station assembly 23, where it passes through the wedge unit 24a.

The photoelectric autocollimator light beam defines the alignment fire control line of site reference axis normally parallel to the ship's centerline 10. The optical reference unit axis is established by navigation from known angular relation to the ship's inertial navigation system. The light paths from the photoelectric autocollimators 44 and 46 to any of the missile prisms 35 is used to detect deviations in missile azimuth alignment. The light path from the photoelectric autocollimator 42, to the optical reference unit detects any angular deviation between the optical reference unit and the reference photoelectric autocollimator that may be induced by ship flexure. The angle misalignment signals produced by the light path to the optical reference unit is combined with the angle misalignment signal produced in a light path to any one missile and the combined angular deviation is the misalignment angle from the missile.

Referring now to FIG. 4, the pentamirror and the associated pentamirror control system is shown. Each pentamirror assembly consists of two mirrors 63 and 64, mounted on a rotating table 60. The mirrors are mounted with the reflecting surfaces 63a and 64a perpendicular to the table surface and facing each other. The mirrors are positioned relative to each other so that by rotating the table 60, light beam K entering the pentamirror assembly may be passed through without effecting its direction or the light beam may be redirected +90° or −90° from its entering path K as shown by light beam K' in FIG. 4a and light beam K' in FIG. 4b. Table 60 is attached through gear train 67 to motor 66. Motor 66 is responsive to a signal from the pentamirror control system 65 and upon the appropriate command will position the pentamirror table to pass the light beam through the pentamirror or direct it ±90° from its incoming path direction to the selected missile.

Referring to FIG. 1, wherein the system is shown, it is seen that each station assembly has two wedge sets, i.e., wedge sets 21a and 21b within station assembly 21. The control over the light path through a station assembly is maintained by positioning of the pentamirrors within each of the station assemblies 21–24. The pentamirrors in each station assembly, although shown in one position in FIG. 1, may be changed in position to pass light through a station assembly, reflect light to its associated port missile or to its associated starboard missile. In the case of station assembly 21, the pentamirrors within this station assembly may be arranged to pass light through wedge set 21a to missile 11' or may be rotated to a second position as shown in FIG. 5b, to pass light through wedge set 21b to missile 11. By properly positioning each of the pentamirrors within the station assemblies, the misalignment angle of each missile of a missile pair may be separately measured by its respective station assembly.

The angle misalignment is sensed by the wedge drive assembly within a station assembly and converted to an electrical signal which causes the missile servo system to correct for any angular misalignment immediately prior to firing the missile. The servo optical resolver system is as described in U.S. Pat. No. 3,326,076.

Figure 2B:
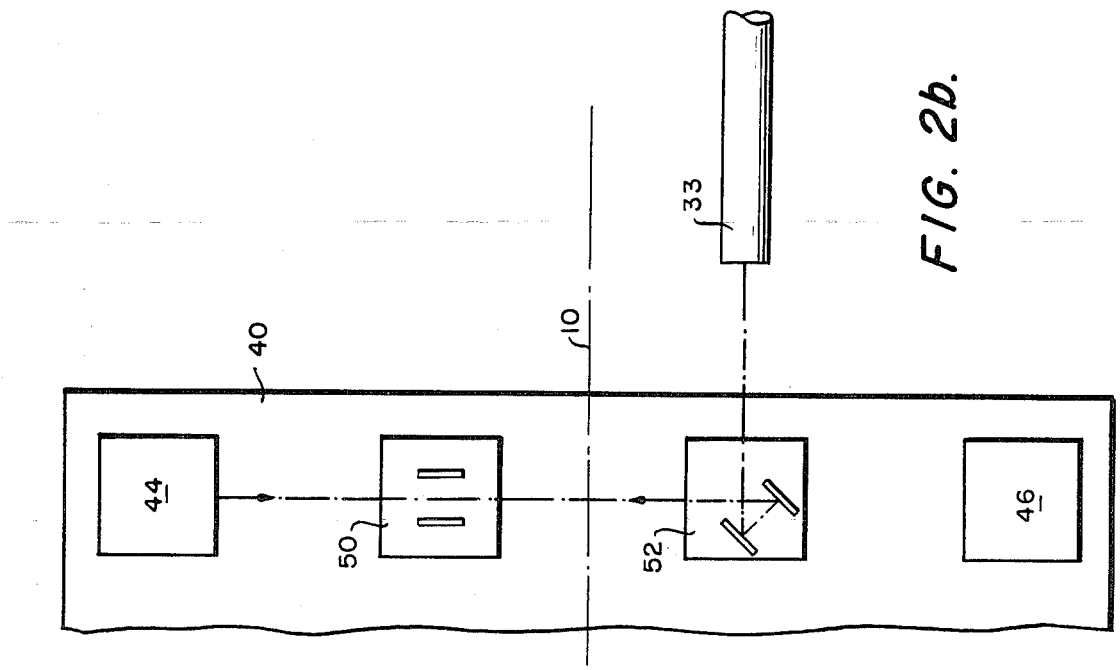
FIG. 2b shows a portion of the system shown in FIG. 1, arranged to operate with a casualty to the port photo-electric autocollimator.
Figure 2A:
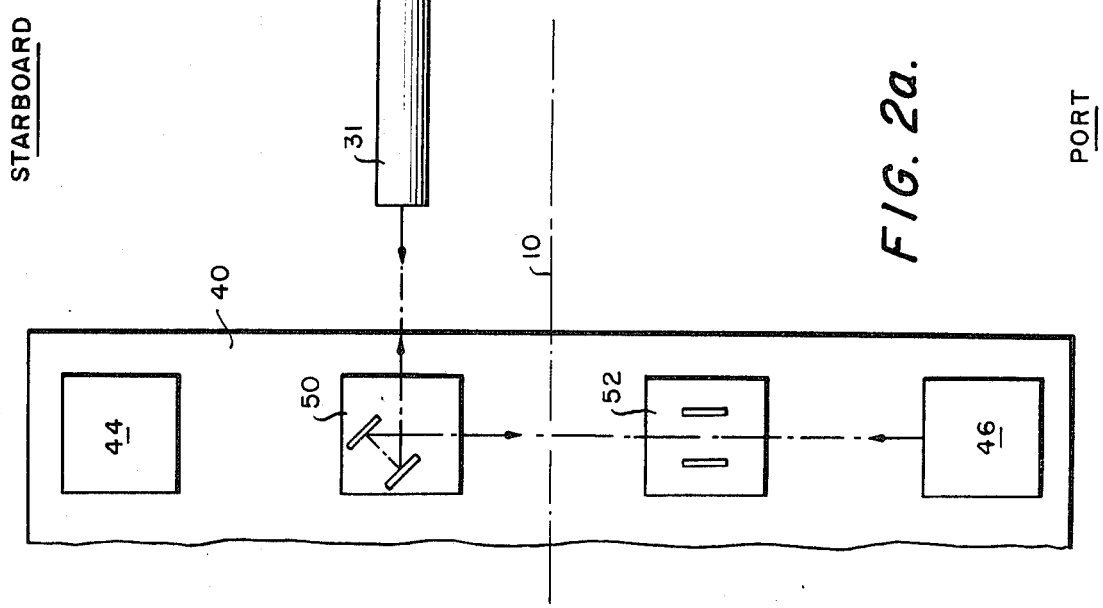
FIG. 2a shows a portion of the system shown in FIG. 1, arranged to operate with a casualty to the starboard photoelectric autocollimator.

Referring now to FIGS. 2a and 2b, the operation of the angular misalignment system is shown where a casualty is suffered by either the starboard photoelectric autocollimator 44 or the port photoelectric autocollimator 46. As shown in FIG. 2a, where the starboard side photoelectric autocollimator 44 cannot be used, the pentamirror 52 can be rotated to its see through position passing the beam of light from photoelectric autocollimator 46 to pentamirror 50. Pentamirror 50 is positioned to direct light from the collimator 46 through to light tube 31 and the station assemblies connected by light tube 31.

As shown in FIG. 2b, when a casualty is suffered by the port side photoelectric autocollimator pentamirror 50 may be rotated to its see through position so that the beam of light from photoelectric autocollimator 44 may be passed through to pentamirror 52. Pentamirror 52 is positioned to direct its beam of light to light tube 33 and the station assemblies associated therewith.

Figure 3B:
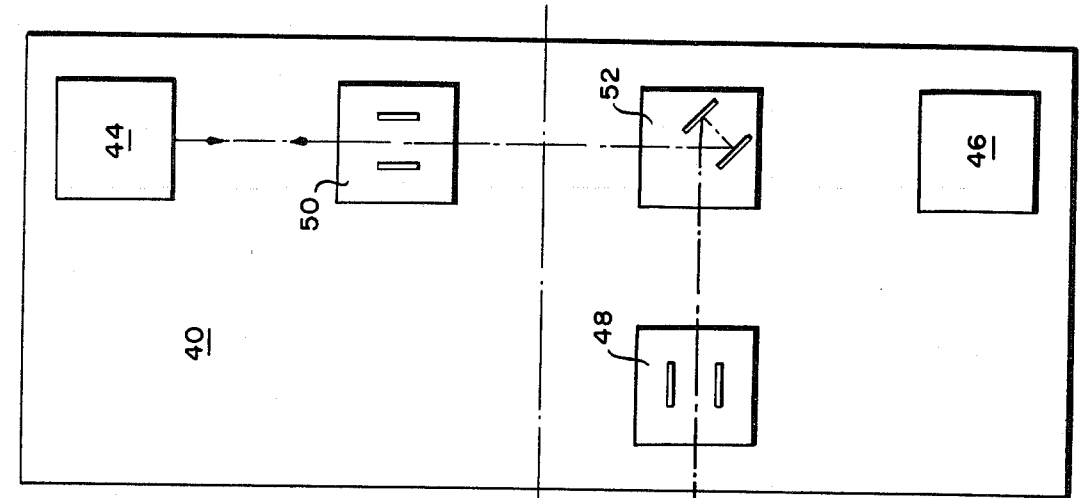
FIG. 3b shows a portion of the system shown in FIG. 1, arranged to align the starboard side photoelectric autocollimator to the ORU.
Figure 3A:
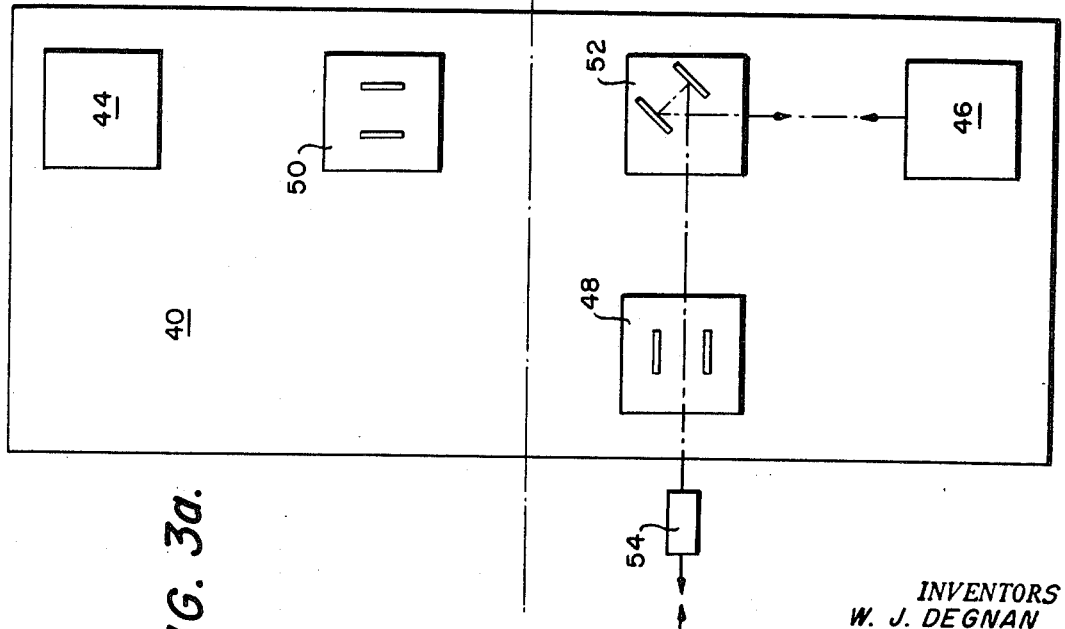
FIG. 3a shows a portion of the system of FIG. 1, arranged to align the port side photoelectric autocollimator with the ORU.

Referring to FIGS. 3a and 3b, it is shown how each of the photoelectric autocollimators 44 and 46 may be separately aligned with the optical reference unit 56. As shown in FIG. 3a, pentamirror 52 is positioned to direct the beam of light from photoelectric autocollimator through to pentamirror 48. Pentamirror 48 is rotated to pass the beam of light from photoelectric autocollimator 46 through periscope 54 to ORU 56. In FIG. 3b, the light beam from photoelectric autocollimator 44 is directed through pentamirror 50 which is positioned to pass the beam of light through it to pentamirror 52. Pentamirror 52 is positioned to direct the beam of light from photoelectric autocollimator 44 through to pentamirror 48, pentamirror 48 being positioned to pass its beam of light through to periscope 54 and on to ORU 56.

Where the optical light path is excessive in length, additional collimators can be placed within the system. For example, the photoelectric autocollimator 42, directing a beam of light towards the optical reference unit can be statically aligned to a second photoelectric autocollimator through the use of a two side test mirror or any other suitable device which is then removed when the alignment is completed.

Obviously many modifications and variations of the present invention are possible in the light of the above teachings. It is therefore to be understood that within the scope of the appended claims the invention may be practiced otherwise than as specifically described.

What is claimed is:

1. In an angular alignment error measuring system for determining the angular misalignment between a missile in an array and the navigational system of a ship;

the measuring system having an optical reference unit aligned with the ship's centerline;

a missile array with missile pairs of said array being positioned opposite each other in the athwart ship direction and separated by the centerline of the ship;

a porro-prism mounted on each missile;

each said missile's orientation being represented by the orientation of its respective porro-prism;

first and second photoelectric autocollimating means disposed between the missile array and the optical reference unit;

the first photoelectric autocollimating means providing and projecting a first collimated light beam to the optical reference unit;

said first photoelectric autocollimating means receiving the light beam reflected by said optical reference unit and providing a first error signal indicative of the angular position of the first photoelectric autocollimating means with respect to the optical reference unit;

the second photoelectric autocollimating means optically aligned with the first autocollimating means, generating a second collimated light beam optically parallel with the first light beam;

station assemblies transferring the second light beam to the missile porro-prism and transferring the reflected light beam from said missile porro-prism to the second photoelectric autocollimating means;

the second photoelectric autocollimating means receiving the reflected light beam and providing a second electrical error signal continuously indicative of the angular position of a missile within said array with respect to the ship's centerline;

the station assemblies additionally including a pentamirror for transferring the light beams between the photoelectric autocollimating means and the porro-prism;

wherein the improvement comprises statically mounted series aligned station assemblies; and the series alignment being parallel to the length of the missile array with a single station assembly aligned with each missile pair, in the athwartship direction.

2. The system of claim 1 wherein each of said station assembly contains a pentamirror assembly, said pentamirror assembly being rotatable about an axis passing between the reflecting surfaces of said pentamirror assembly whereby a beam of light may be changed in direction plus or minus 90° and directed to each missile in said missile pair or the beam may be passed through a station assembly between the pentamirror surfaces to the next succeeding station assembly in the array.

3. The system of claim 2 wherein the series station assemblies are connected by a light confining means; and said light confining means is a light tube to limit thermal disturbances in the light beam.

4. The system of claim 1 including:

a third photoelectric autocollimating means optically aligned with the first autocollimating means, generating a third collimated beam of light, directed optically parallel with the first light beam, and directed to said station assemblies;

said station assemblies including a first and second set of series aligned station assemblies;

said second photoelectric autocollimator being aligned with said first set of series aligned station assemblies;

said third photoelectric autocollimator being aligned with said second set of series aligned station assemblies.

5. The system of claim 4, including:

means to direct a beam of light from said second photoelectric autocollimator to said second set of station assemblies for detecting the misalignment angle of a missile aligned with said second set of station assemblies; and means to direct a beam of light from said third photoelectric autocollimator to said first set of station assemblies for detecting a misalignment angle of a missile aligned with said first set of station assemblies.

6. The system of claim 5 including:

means to direct a beam of light from said second photoelectric autocollimator to said first set of station assemblies for detecting the misalignment angle of a missile aligned with said second set of station assemblies; and means to direct a beam of light from said third photoelectric autocollimator to said second set of station assemblies for detecting a misalignment angle of a missile aligned with said first set of station assemblies.

* * * * *